(12) United States Patent
Yang et al.

(10) Patent No.: US 12,003,300 B2
(45) Date of Patent: Jun. 4, 2024

(54) HIERARCHICAL CHANNEL STATE INFORMATION (CSI) FEEDBACK WITH PARTIAL RECIPROCITY IN A NETWORK

(71) Applicant: Apple Inc., Cupertino, CA (US)

(72) Inventors: Weidong Yang, San Diego, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Ismael Gutierrez Gonzalez, Sunnyvale, CA (US); Jie Cui, Cupertino, CA (US); Oghenekome Oteri, San Diego, CA (US); Sigen Ye, Cupertino, CA (US); Wei Zeng, Cupertino, CA (US); Yang Tang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,429

(22) PCT Filed: Aug. 7, 2020

(86) PCT No.: PCT/CN2020/107926
§ 371 (c)(1),
(2) Date: Sep. 23, 2021

(87) PCT Pub. No.: WO2022/027631
PCT Pub. Date: Feb. 10, 2022

(65) Prior Publication Data
US 2023/0208488 A1   Jun. 29, 2023

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0478* (2013.01); *H04L 5/0051* (2013.01)

(58) Field of Classification Search
CPC .... H04B 7/0626; H04B 7/0478; H04L 5/0051
See application file for complete search history.

(56) References Cited

U.S. PATENT DOCUMENTS

| 2015/0016288 A1 | 1/2015 | Maattanen et al. |
| 2019/0081680 A1* | 3/2019 | Wu ...................... H04B 7/0639 |
| 2019/0123864 A1* | 4/2019 | Zhang ..................... H04L 5/005 |

FOREIGN PATENT DOCUMENTS

| CN | 102882632 A | 1/2013 |
| CN | 104396151 A | 3/2015 |

(Continued)

OTHER PUBLICATIONS

Zhang et al., A novel hierarchical channel state information measurement and feedback scheme in massive MIMO systems, IEEE (Year: 2016).*

(Continued)

*Primary Examiner* — Ashley Shivers
(74) *Attorney, Agent, or Firm* — Eschweiler & Potashnik, LLC

(57) ABSTRACT

A base station or other network component (next generation NodeB (gNB)) can operate to transmit a channel state information reference signal (CSI-RS) for channel state information (CSI) feedback. The CSI feedback can be received as corresponding to one or more frequency parts at hierarchical precoding levels of a frequency band based on a hierarchical precoding scheme in response to providing the CSI-RS.

20 Claims, 7 Drawing Sheets

(56) References Cited

FOREIGN PATENT DOCUMENTS

| | | | |
|---|---|---|---|
| CN | 107204794 A | 9/2017 | |
| CN | 108880644 A | 11/2018 | |
| CN | 108886434 A | 11/2018 | |
| CN | 109952716 A | 6/2019 | |
| WO | 2016204370 A1 | 12/2016 | |
| WO | 2018148981 A1 | 8/2018 | |

OTHER PUBLICATIONS

International Search Report dated May 6, 2021 for International Application PCT/CN2020/107938.
International Written Opinion dated May 6, 2021 for International Application PCT/CN2020/107938.
International Search Report dated Apr. 30, 2021 for International Application PCT/CN2020/107926.
International Written Opinion dated Apr. 30, 2021 for International Application PCT/CN2020/107926.
Qualcomm Incorporated; "Views on CSI Enhancements for MU-MIMO"; 3GPP TSG-RAN WG1 #84bis; R1-163043; Apr. 15, 2016.
U.S. Appl. No. 17/442,413, filed Sep. 23, 2021.
International Preliminary Report on Patentability dated Feb. 7, 2023 in connection with Application Serial No. PCT/CN2020/107938.
International Preliminary Report on Patentability dated Feb. 7, 2023 in connection with Application Serial No. PCT/CN2020/107926.
European Extended Search Report mailed Mar. 14, 2024 in connection with Application No. EP20947987.2.
European Extended Search Report mailed Apr. 8, 2024 in connection with Application No. EP20948515.0.
Hongmei Sun; Proposed Text for Feedback Allocation A-MAP Information Elements and FBCH contents for UL Control in the 802.16m AWD; IEEE 802.16 Broadband Wireless Access Working Group; <http://ieee802.org/16; IEEE C80216m-09/0991; Apr. 27, 2009.
Enhancements on Type II CSI feedback for MU-MIMO; 3GPP TSG RAN WG1 Meeting #94; Gothenburg, Sweden, Aug. 20-24, 2018; ZTE; 7.1.2.5; Discussion and Decision; R1-1808201.

\* cited by examiner

HIERARCHICAL CHANNEL STATE INFORMATION (CSI) FEEDBACK WITH PARTIAL RECIPROCITY IN A NETWORK

REFERENCE TO RELATED APPLICATIONS

This application is a National Phase entry application of International Patent Application No. PCT/CN2020/107926 filed Aug. 7, 2020, entitled "HIERARCHICAL CHANNEL STATE INFORMATION (CSI) FEEDBACK WITH PARTIAL RECIPROCITY IN A NETWORK", the contents of which are herein incorporated by reference in their entirety.

FIELD

The present disclosure related to wireless technology, and more specifically, pertains to technique for hierarchical channel state information (CSI) feedback of a user equipment (UE) with partial reciprocity.

BACKGROUND

The explosive wireless traffic growth leads to an urgent need of rate improvement. With mature physical layer techniques, further improvement in the spectral efficiency could be marginal. On the other hand, the scarcity of licensed spectrum in low frequency band results in a deficit in the data rate boost. The next generation wireless communication system, 5G, will provide access to information and sharing of data anywhere, anytime by various users and applications. 5G is expected to be a unified network/system that target to meet vastly different and sometime conflicting performance dimensions and services. Such diverse multi-dimensional requirements are driven by different services and applications. In general, 5G could evolve based on 3GPP long term evolution (LTE) advanced (LTE-Adv) with additional potential new Radio Access Technologies (RATs) to enrich people lives with better, simple and seamless wireless connectivity solutions. 5G will enable many devices to be connected by wireless communications and deliver fast, rich contents and services Similar to LTE, multiple antenna techniques can be a key technology component in 3GPP 5G new radio (NR) systems. Specifically, beamforming with very narrow beam width, leading to high beamforming gain, can be an important tool for high frequency NR to achieve target coverage. To operate in a wide frequency range from below 6 GHz to 100 GHz, for example, 3GPP NR aims to provide a unified approach to realize single and multi-beam transmission. Multiple antennas can also be implemented at a transmitting device such as a Transmission Reception Point (TRP) (e.g., eNodeB (eNB)/Next Generation NodeB (gNB)/base station antenna panel) and the user equipment (UE), and are referred to as multiple-input, multiple-output (MIMO) devices. MIMO technology is the use of multiple antennas or antenna arrays/panels at one or more transmitters (Tx) and one or more receivers (Rx). A MIMO system can be used to increase data throughput and link reliability of a network without increasing bandwidth frequencies or increasing transmit power of the network. To achieve this, the data communicated between a node (eNB/gNB) and a mobile device (e.g., UE) can be spread over the multiple antennas to achieve an array gain that improves a spectral efficiency and achieves a diversity gain. Massive MIMOs can deploy a large number of antenna elements in antenna arrays. Multiple terminals can be deployed for combining a massive MIMO technology with conventional time and frequency division multiplexing using orthogonal frequency division multiplexing (OFDM).

Three-dimensional (3D) or full-dimensional (FD) MIMO systems can be used in MIMO networks to enhance the cellular performance by deploying antenna elements in both horizontal and vertical dimensions, e.g. a two dimensional (2D) antenna array. A FD MIMO system can direct communications in two dimensions, i.e. horizontally and vertically, to a location in three dimensional (3D) space. The direction of communications in 3D space can increase the directionality, allowing for increased numbers of communication paths, more focused beamforming, and increased throughput for spatial multiplexing in comparison with traditional two dimensional MIMO systems.

DETAILED DESCRIPTION

Figure 1:
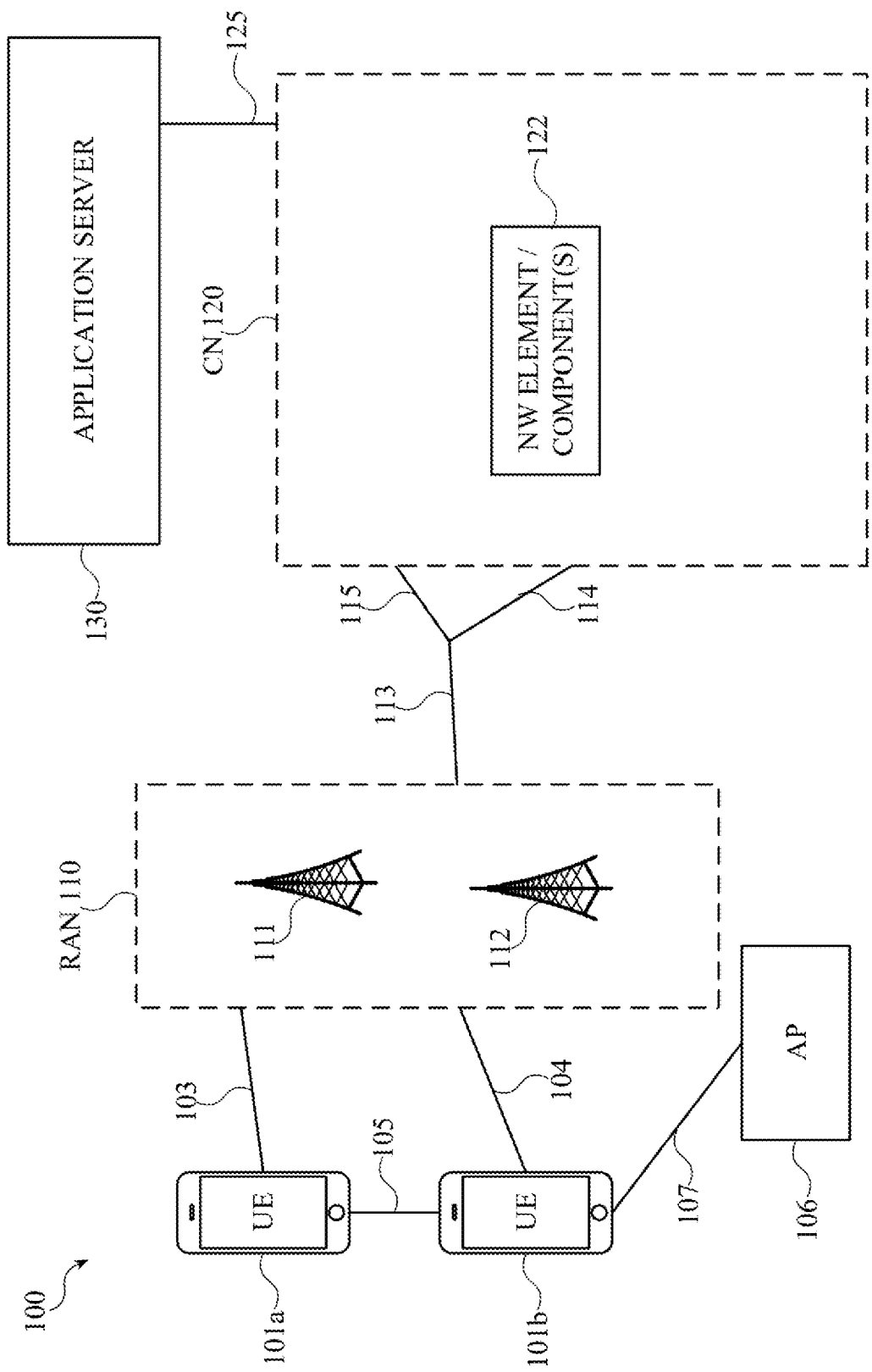
FIG. 1 is an exemplary block diagram illustrating an example of user equipment(s) (UEs) communicatively coupled a network with network components as peer devices useable in connection with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of the above, various aspects/embodiments are disclosed for communications in a beamforming system or beamforming network device (e.g., user equipment (UE), evolved NodeB (eNB), a next generation NodeB (gNB), new radio (NR) base station (BS), a multi-input multi-output (MIMO) device, single-input multi-output (SIMO) device, or the like). In particular, with respect to LTE advanced and 5G NR devices, issues related to performance (power efficiency, beamforming, channel quality, etc.) can arise for beam management procedures, including CSI reporting for channel state information (CSI) about the downlink channel observed by the receiver (Rx) can be improved. For example, for MU-MIMO pairing, wideband precoding can lead to a big loss in cell edge and median UE throughputs compared with sub-band precoding. Although the precoding scheme for a physical downlink shared channel (PDSCH), for example, is not exactly always wideband, assuming the same frequency selective precoder as for a channel state information-reference signal (CSI-RS) is used along with the wideband precoder as recommended by the UE to PDSCH transmission, the composite precoder can be frequency selective. However, the wideband PMI feedback may work well with a particular gNB precoding scheme for CSI-RS, but it may not work well with other gNB precoding schemes, especially for full division duplex (FDD) operations with partial reciprocity, as well as for time division duplex (TDD) operation. Consequently, improving precoding performance for UEs with the network gNB, for example, by lowering an overhead or feedback overhead while ensuring the gNB accurately obtains channel or sub-band spacing information is a priority.

CSI can be obtained by the transmit side (Tx), or network side, from the Rx: a) from estimation of the uplink channel, and by using channel reciprocity of the wireless channel; and b) from quantized feedback measured by the Rx. The quantized form of CSI feedback can be used for both FDD and TDD operational systems. Quantized CSI (or referred to as CSI) includes the precoding matrix index (PMI) to assist beamforming or precoding selection at the Tx antennas of the gNB. The set (or group) of possible PMIs is denoted as a codebook. To different possible deployments of the 5G New Radio (NR) system, a codebook is designed and configured to provide reasonable performance in all possible serving directions of the gNB. However, depending on the actual deployment of the gNB, the usage of some PMIs in such codebook can be avoided. For example, considering the interference that may be created to the neighboring cells, some of the PMI vectors result in a higher interference in the downlink (DL) channel with respect to other PMI vectors, or PMIs. To avoid CSI reporting with large feedback overhead in particular a hierarchical precoding scheme can be configured in the consideration of beamforming and utilized by the UE for CSI feedback.

In an aspect, the UE can configure CSI feedback according to the hierarchical precoding scheme to selectively reduce a feedback overhead associated with the CSI feedback. In particular, the UE can configure a precoding hierarchy for hierarchical frequency selective precoding to provide precoders for the CSI feedback associated with hierarchical precoding levels of the precoding hierarchy. This can selectively reduce feedback overhead by allowing the UE to prune precoders of sub-bands that belong to frequency parts at hierarchical levels. As referred to in general herein, a sub-band can be portions of frequency parts divided from a frequency band at a lowest-hierarchical precoding level of a precoding hierarchy, in which the sub-bands are at a highest-indexed level, for example. A frequency part can be referred to herein as a divided portion of the frequency band that is not at a lowest-level of the precoding hierarchy. However, the terms used as a "frequency part" and a sub-band could be used interchangeably.

Additional aspects and details of the disclosure are further described below with reference to figures.

FIG. 1 illustrates an example architecture of a system 100 of a network, in accordance with various embodiments (aspects). The following description is provided for an example system 100 that operates in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, or communicatively couple, with a Radio Access Network (RAN) 110. In embodiments, the RAN 110 can be an next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111, 112, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (ANs) or RAN nodes 111a and 111b (collectively, or independently, referred to as "RAN nodes 111", "RAN node 111", or "RAN 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (e.g., a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally or alternatively, one or more of the RAN nodes 111 can be next generation eNBs (gNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments (aspects) is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

The LAA mechanisms are built upon carrier aggregation (CA) technologies of LTE-Advanced systems. In CA, each aggregated carrier is referred to as a component carrier (CC). In some cases, individual CCs can have a different bandwidth than other CCs. In time division duplex (TDD) systems, the number of CCs as well as the bandwidths of each CC can be the same for DL and UL. CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information, wherein a number of CCEs (e.g., 6 or the like) can consists of a resource element groups (REGs), where a REG is defined as a physical resource block (PRB) in an OFDM symbol. Before being mapped to resource elements, the PDCCH complex-valued symbols can first be organized into quadruplets, which can then be permuted using a sub-block interleaver for rate matching, for example. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, or 16).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to the above, each ECCE can correspond to nine sets of four physical resource elements known as an EREGs. An ECCE can have other numbers of EREGs in some situations.

The RAN nodes 110 can be configured to communicate with one another via an interface. In embodiments where the system 100 is an LTE system, the interface can be an X2 interface. The X2 interface can be defined between two or more RAN nodes 111 (e.g., two or more eNBs/gNBs and the like) that connect to evolved packet core (EPC) or core network 120, or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface and can be used to communicate information about the delivery of user data between eNBs or gNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC or 5GC 120, and the RAN 110 can be connected with the CN 120 via an NG interface 113. In embodiments, the NG interface 113 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an evolved packet core (EPC)). Where CN 120 is an EPC (referred to as "EPC 120" or the like), the RAN 110 can be connected with the CN 120 via an S1 interface 113. In embodiments, the S1 interface 113 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
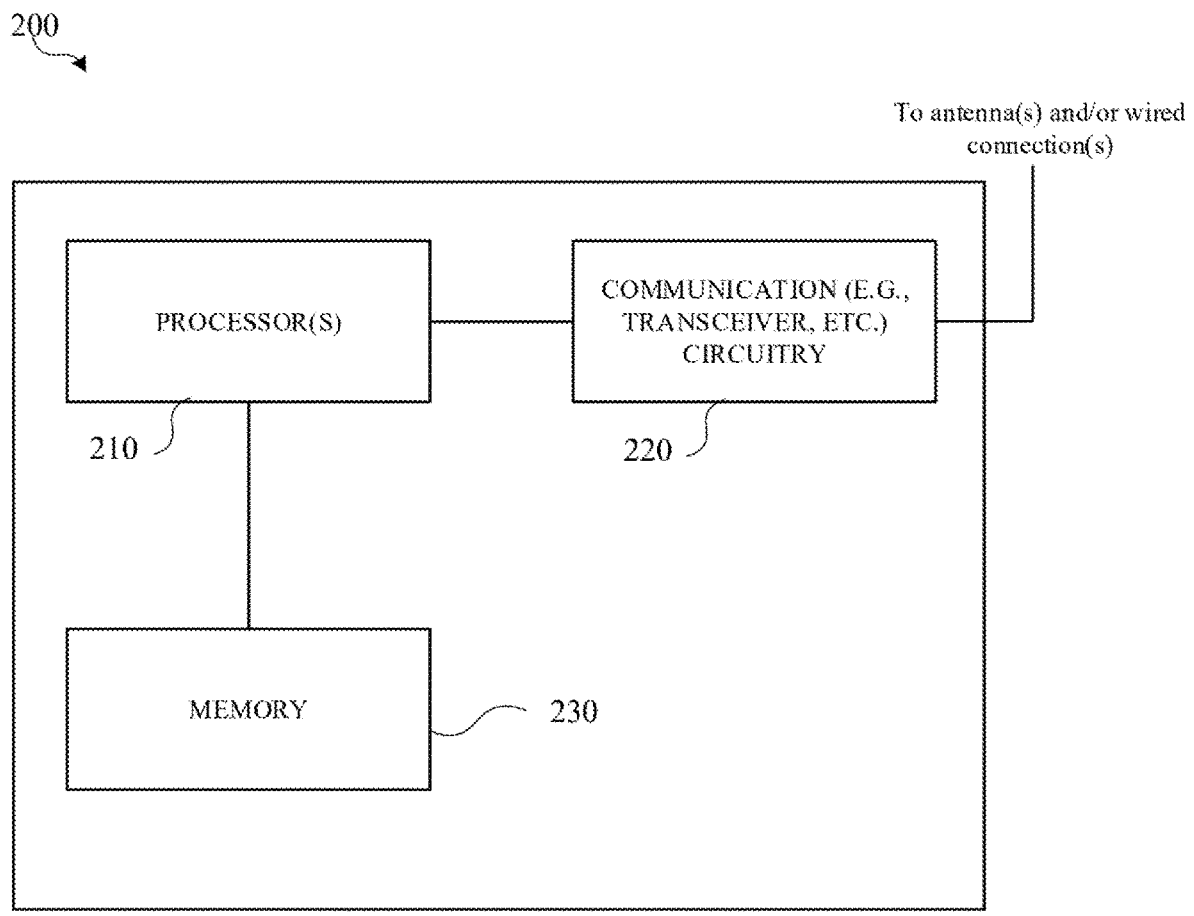
FIG. 2 is an exemplary a simplified block diagram of a user equipment (UE) wireless communication device or other network device/component (e.g., eNB, gNB) in accordance with various aspects.

Referring to FIG. 2, illustrated is a block diagram of a user equipment (UE) device or other network device/component (e.g., gNB, eNB, or other participating network entity/component). The device 200 includes one or more processors 210 (e.g., one or more baseband processors) comprising processing circuitry and associated interface(s), transceiver circuitry 220 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 230 (which can comprise any of a variety of storage mediums and can store instructions and/or data associated with one or more of processor(s) 210 or transceiver circuitry 220).

In addition, the memory 230 (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. As described in greater detail below, system 400 can facilitate greater power efficiency for beam management operations, including CSI reporting/feedback based on a hierarchical precoding scheme.

According to various aspects, the UE 200/101 can operate to configure channel state information (CSI) reporting configurations to enable a pre-coding matrix indicator (PMI) as CSI feedback (reporting) associated with a rank indicator (RI), wideband channel quality indicator (CaI), or sub-band CQI. PMI precoders can be configured based on a hierarchical precoding scheme for hierarchical frequency selective precoding to configure the CSI feedback from the UE 200/101. The transmission can then be processed by the gNB 111, 112, or 200 for beam forming based on the codebook(s) formed by the feedback.

CSI feedback for FDD or TDD can be based on partial reciprocity between the UE 101 and the gNB 111, for example. Theoretically not all multipath parameters for FDD downlink and uplink channels are necessarily equivalent. Therefore, full reciprocity does not necessarily hold while the partial reciprocity property holds. Uplink sounding reference signal (SRS) are mainly used for CSI measurements to enable scheduling and link adaptation on the UL frequency. By exploiting the channel reciprocity, in TDD, for example, the transmitter or gNB 111 can estimate the downlink channel from the SRS on the uplink channel. However, such reciprocity relies on accurate calibration of the transceiver RF chains at the gNB 111. Sounding mechanisms for estimation of the UL channel on different bandwidths (sub-band or wideband) depend on terminal channel conditions. Terminals close to the gNB 111 are not necessarily power limited, and thus, could be allocated wideband sounding in order to provide CSI estimation on the whole frequency band. Cell-edge terminals on the other hand are power limited and could only allocate power to some limited sub-bands. The gNB 111 relies on the CSI to process antennas coherently. The gNB 111 utilizes sub-band spacing information, for example, but ensuring such information can come with overhead cost, especially with MIMO schemes. As such, sub-band feedback in the CSI to the gNB 111 can be beneficial, especially with respect to defining PMI feedback in the CSI feedback.

In a particular example of SRS signaling, the UE 101, for example, sends SRS to the gNB 111 at an uplink carrier frequency $f_u$. The gNB 111 can receive the SRS with multiple Rx antennas and extracts parameters/characteristics such as angle of arrival (AoA), delay spread, angular spread, mean AoD (Angle of Departure), or the like, from the received signals. The gNB 111 assumes the same parameters/characteristics or derives parameters/characteristics through frequency translation for downlink frequency $f_d$. After generating a precoder for CSI-RS, the gNB 111 can apply the precoder to the transmission of the CSI-RS as precoded CSI-RS according to the constructed parameters for the downlink frequency $f_d$. The gNB 111 can also adopt frequency selective (sub-band-based) precoding on the CSI-RS. Then the UE 101 can receive the CSI-RS and respond by feeding back the wideband PMI and sub-band CQI as CSI feedback to the network. The CSI feedback can affect network system performance with respect to average throughput or cell edge throughput however.

In an aspect, a hierarchical precoding scheme can be configured by the UE 101 by configuring a precoding hierarchy. A frequency band or wideband, for example, can be divided into frequency parts and configured into a hierarchical tree so that these divided parts form different hierarchical levels of the precoding hierarchy. The frequency parts can further be sub-divided into sub-bands. If a difference in the precoders associated with the sub-bands is realized, then these precoders are not eliminated and maintained to be communicated in the CSI feedback. However, if no difference is observed between the frequency parts and sub-bands, then the frequency parts of sub-bands of the frequency parts are eliminated. Thus, the hierarchical precoding scheme can selectively reduce the amount of feedback overhead for the CSI feedback, increases efficiency and removes network costs in terms of resources.

Figure 3:
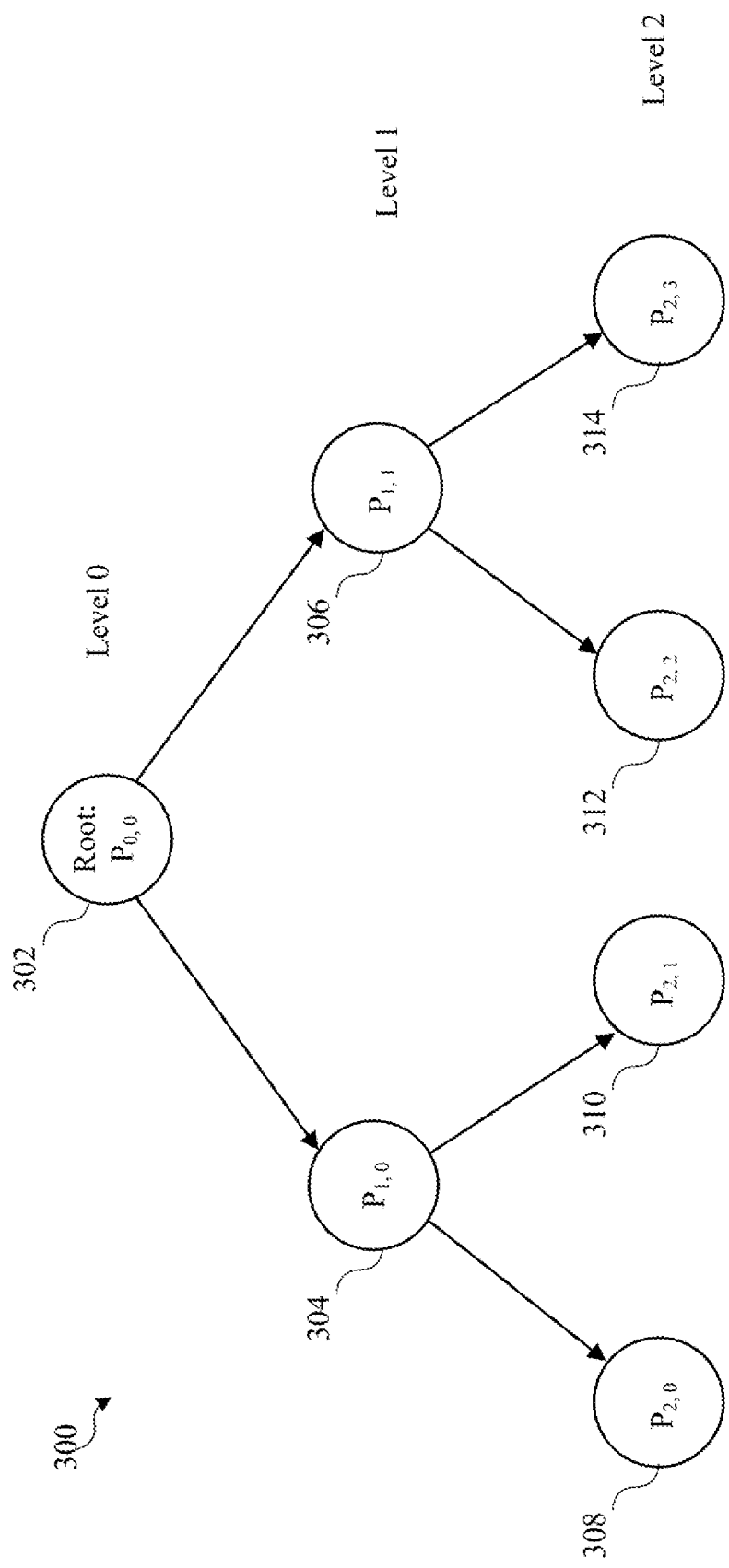
FIG. 3 is an illustration of an example precoding hierarchy for a hierarchical precoding scheme in accordance with various aspects.

Referring to FIG. 3, illustrated is an example of a precoding hierarchy configured for a hierarchical based scheme to perform hierarchical frequency selective precoding in accord with various aspects (or embodiments). The precoding hierarchy 300 comprises a root frequency part 302 that includes a wideband or a frequency band being considered for generating PMI precoders in CSI feedback. The root frequency part can be designated as root frequency part 302 indexed as frequency part $P_{0,0}$, which corresponds to the lowest-indexed level of the precoding hierarchy 300 as illustrated at the top-level of the precoding hierarchy 300. Although illustrated with three hierarchical precoding levels (Level 0, Level 1, Level 2), the precoding hierarchy 300 can be configured with any number of hierarchical levels.

A next higher-indexed level (Level 1) with respect to the root frequency part 302 corresponds to frequency parts 304 and 306 that have been divided from the root frequency part 302, which includes both of the frequency parts 302 and 304, and sub-bands 308, 310, 312, and 314, for example. Each frequency part 304 and 306, indexed as frequency parts $P_{1,0}$, $P_{1,1}$, are further divided (sub-divided) into the sub-bands 308 thru 314 at the highest-indexed level (Level 2) of the precoding hierarchy 300 as sub-bands indexed as $P_{2,0}$, $P_{2,1}$, $P_{2,2}$, $P_{2,3}$.

Each sub-band can belong to frequency parts at H hierarchical levels, in which H can be any integer greater than zero. In an example, hierarchical levels H can be represente as follows: $H=\lceil \log_2 N \rceil$, where N can be the number of sub-bands (e.g., sub-bands 308 thru 314 indexed $P_{2,0}$, $P_{2,1}$, $P_{2,2}$, $P_{2,3}$) for CSI feedback. At level 0 (the Root), there is a single frequency part $P_{0,0}$ as the root frequency part 302 consisting of all sub-bands 308 thru 314. At level 1, below frequency part $P_{0,0}$, at a higher-indexed level (Level 1) than level 0, there are two frequency parts 304 and 306 indexed as frequency parts $P_{1,0}$, $P_{1,1}$.

Figure 4:
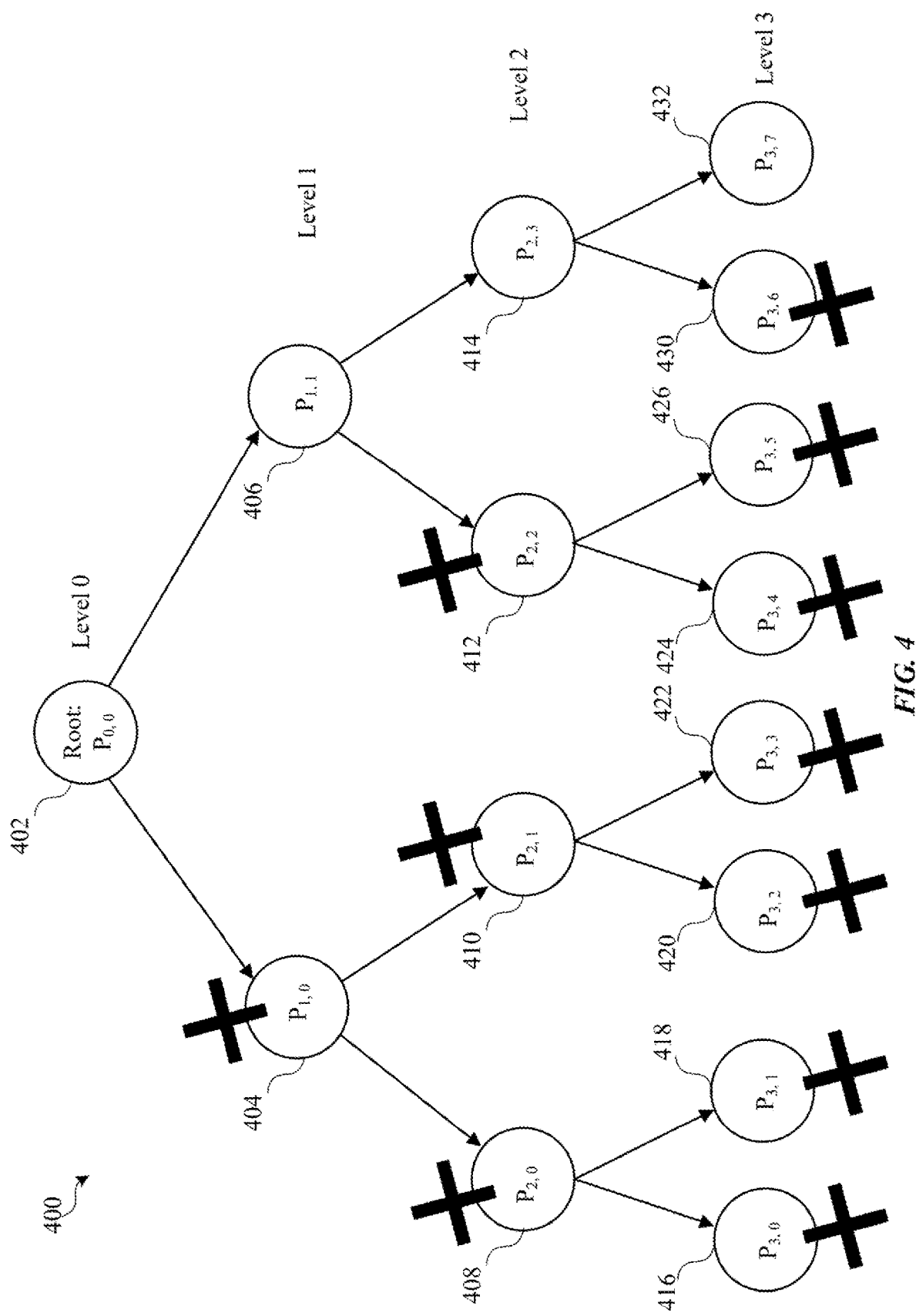
FIG. 4 is an illustration of another example precoding hierarchy for a hierarchical precoding scheme in accordance with various aspects.

Overall, at a hierarchical precoding level h, for frequency part $P_{h-1,m}$, m=0, ..., $2^{h-1}-1$, from level h−1, there are two frequency parts $P_{h,2m}$ and $P_{h,2m+1}$ which divide the sub-bands from the frequency part $P_{h-1,m}$ approximately equally between them; alternatively, the dividing can be formulated such that there are two sub-trees (leaves) $P_{h,2m}$ and $P_{h,2m+1}$ from sub-tree $P_{h-1,m}$. For a particular N which is not a power of 2, the precoding hierarchy can be configure so there is only one sub-tree (leaf) $P_{h,2m}$ or $P_{h,2m+1}$ from sub-tree $P_{h-1,m}$, (e.g. for umost left or the umost right leaves) at a given hierarchical precoding level. For example for N=7, $P_{3,7}$ or $P_{3,0}$ may not be present in FIG. 4 (note FIG. 4 is the illustration for N=8). In another case, some leaves (or leaf, as a frequency part or sub-band) on the utmost right side and some leaves(leaf) on the utmost left side are not necessarily present at a given hierarchical precoding level.

In an aspect, frequency parts 304 and 306 indexed as frequency parts $P_{1,0}$, $P_{1,1}$ at level 1 can be divided as sub-bands from frequency part $P_{0,0}$ approximately equally between them. Thus, each frequency part of the precoding hierarchy 300 can be a nearly equal or equal division of a parent frequency part above at a lower-indexed level. In particular, the wideband precoder could still be configured for all four sub-bands, but the wideband frequency part can be divided into two portions. For example, if a certain number (e.g., 32 or other number) of physical resource blocks (PRBs) are divided into two portions another precoder can be configured for one frequency part into a portion of PRBs and if the difference between peer portions (e.g., 308 or 310), as portions from a same parent frequency part (e.g., 304), is small or negligible these sub-bands (e.g., 308, 310) can be eliminated from the CSI feedback. A similar evaluation/elimination can be done throughout the precoder hierarchy, for example to select a single sub-band and associated parent parts for feedback. Then for other sub-band under a lower indexed frequency part the same can be performed, in which again PRBs can be divided into two portions and two additional PMI precoders can be configured and compared. If a difference is not significant enough, then no feedback overhead is incurred for these portions or sub-bands, for example. In this manner, a same performance can be achieved for PMIs, but with elss overhead feedback.

In an example, pruning or elimination can be performed or analyzed according to a top-up approach or a bottom-down approach. Here, one or more bitmaps corresponding to the hierarchical precoding levels, respectively, can be configured or evaluated based on a top-down approach by starting at a lowest-indexed hierarchical precoding level in a precoding hierarchy of the hierarchical precoding scheme. The lowest-indexed hierarchical precoding level comprises the frequency band as a root frequency part 302, for example. Alternatively, or additionally, one or more bitmaps can be configured or evaluated by corresponding to the hierarchical precoding levels, respectively, based on a bottom-up approach starting at a highest indexed hierarchical precoding level, such as the sub-bands 308 thru 314. One or both approaches can be utilized to determine precoder positions from the CSI feedback provided by the UE 101 to gNB 111, for example, based on the hierarchical precoding scheme.

Alternatively, or additionally, the precoding hierarchy can be configured so that there are two sub-trees (leaves) 304 and 306 from the root 302 of the hierarchy tree structure comprising the precoding hierarchy 300. Each of these can further form branches in the sub-trees being further divided into sub-bands 308 and 310, sub-divided from frequency part 304, and sub-bands 312 and 314, sub-divided from frequency part 306, for example. Although three levels including the root frequency part 302 at level 0, the frequency parts 304 and 306 at level 1, and the sub-bands 308 thru 314 at level 2 are illustrated as three levels, one or more different hierarchical precoding levels and also be configured as part of the precoding hierarchy 300 as forming additionally frequency parts or sub-bands for determining CSI feedback. Overall, the feedback information from different hierarchical levels can be used in a number of ways: first, the feedback information from the root level to the highest-indexed level are utilized, which can come in the form of applying product of precoders at different hierarchical levels, or applying all the underlying feedback parameters at different hierarchical levels to come up with a composite feedback parameter applicable to the current sub-band; in a second way, the feedback information can come from a single hierarchical level being used.

A same parturition process corresponding to the precoder hierarchy 300 can be configured by the UE 101 until level H is reached for generating precoders for CSI feedback, in which H represents the number of hierarchical levels of the precoding hierarchy. The UE 101 generates precoders associated with the frequency parts 304, 306 or sub-bands 308 thru 314 at the different hierarchical levels (hierarchical precoding levels). For example, $W_{h,m}$ can correspond to a precoder at hierarchy precoding level h and frequency part m, h=0, 1, . . . , H, and m=0, . . . , $2^h-1$. A dimension of $W_{0,0}$ can be represented as $N_{tx} \times R$, where $N_{tx}$ can represent a CSI RS port number, and R represent a feedback rank indicator (RI) value.

Alternatively, or additionally, $W_{0,0}$ can be represented as the product of $\tilde{W}_{0,0}$ and $B_{0,0}$, e where $\tilde{W}_{0,0}$ is $N_{tx} \times R_1$, and $B_{0,0}$ is $R_1 \times R$, $N_{tx}$ can be a CSI-RS port number, $R_1$ can be a parameter depending on feedback rank indicator (RI) number or value (i.e. R), where $R_1 > R$. The parameter $R_1$ can be utilized to distinguish the values from R as seen for R=1: if $R_1=R$, in which case it can be difficult to introduce adoption to the frequency as $W_{0,0}$ is a rank-1 precoder already. However, with $R_1=2$, for example, different combining coefficients or a rotation matrix can be configured accordingly for adopting the channel to the frequency.

Alternatively, or additionally, for h=0, 1, . . . , H, and m=0, . . . , $2^h-1$, two matrices $A_{h,m}$ and $B_{h,m}$ are generated where $A_{h,m}$ is $R_1 \times R_1$, and $B_{h,m}$ is rank dependent, e.g. $R_1 \times R$. Then the precoder for sub-band n can be given by $(W_{0,0} \Pi_{h=1}^{H} A_{h,f(h,n)}) B_{h,m}$, where $$f(h, n) = \left\lceil \frac{n}{2^{H-h}} \right\rceil.$$

In another aspect, the UE 101 can configure a feedback overhead according to one or more overhead reduction mechanisms. For example, the UE 101 can configure each hierarchical precoding level with a different amount of feedback overhead differently. At the root level or level 0, the feedback overhead can be higher, and then progressively the feedback overhead at higher-indexed levels (e.g., Level 1, or Level 2) can be limited less and less along the hierarchical levels of a higher index, or prevented from increasing after a predefined level. At the root frequency part 302, for example, a larger amount of information is utilized with a greater feedback priority, and thus finer additional information (e.g., rotational angle, or other parameter data) is defined for the CSI feedback. At each lower level, or higher-indexed hierarchical level, a refinement can be performed so that the information is coarser or less detailed with less priority, and thus, utilizing less bits of information for the CSI feedback. In an example, a precoder codebook with precoders for the CSI feedback can have progressively coarser resolutions for rotation angles at higher-indexed hierarchical precoding levels (e.g., Level 1 with frequency parts (304, 306), or Level 2 with sub-bands (308-314)) than for lower-indexed hierarchical precoding levels (e.g., Level 1, root 302) for the hierarchical precoding scheme.

In another aspect, the UE 101 can configure a feedback overhead according to one or more overhead reduction mechanisms that include pruning individual sub-bands, or as sub-trees together (e.g., sub-bands 308 and 310 with frequency part 304) formed from children nodes (e.g., sub-band 308, 310, 312, or 314) of a parent hierarchical level of one or more frequency parts (e.g., 304 or 306) in the hierarchical precoding scheme. For some sub-trees, a finer differentiation for its two children is not necessary (hence differentiation is not necessary for all the offspring (e.g., sub-bands 308 and 310 of that particular sub-tree (e.g., parent frequency part 304)). In this case, the whole sub-tree structure could be pruned (e.g., sub-bands 308 and 310 with frequency part 304), and no feedback overhead is incurred for its offspring (e.g., sub-bands 308 and 310). Related to this mechanism, the UE 101 can configure a bitmap representing the sub-bands 308 thru 314 in the CSI report that can be used, in which each bit can correspond to a sub-band 308 thru 314. The UE 101 can configure the bitmap with the hierarchical precoding level to indicate non-pruned sub-bands and pruned sub-bands associated with the CSI feedback.

For example, for a given sub-band, "0" can indicate no feedback at level H, and "1" indicate that feedback at level H is being provided, or vice-versa.

In other aspects, feedback overhead reduction can be configured by combining the above aspects for reduction or utilizing each independently of one another so that overall and consistent with the hierarchical precoding scheme a channels' physical properties are not directly relied upon, but rather channel correlation among CSI subtends or related parameters. For example, pruning could be utilized in combination with coarser feedback along higher-indexed precoding levels.

The number N can be determined from the number of PRBs in a bandwidth part and the sub-band size, similar to as found in TS 38.214 with reference to Table 5.2.1.4-2: Configurable sub-band sizes. When N sub-bands is not a power of 2, the frequency parts can be determined according to either a fixed size or adapted to a size of its parent frequency part so approximately equal portions are given to siblings or child parts. In a simplified example, N=4 sub-bands could be generated for CSI report, which can be numbered as $B_k$, k=1, 2, 3, ..., N. Here, N is a power of 2 to simplify the description, but further description is provided below where N is not a power of 2, as illustrated in FIG. 4. The UE 101 can generate precoders represented the following precoder representation: $W_{h,m}$, which can be a precoder at hierarchy h and frequency part M. The UE 101 generates precoder(s) at hierarchy h=0, 1, ..., 2, for either the wideband or a frequency band. $W_{0,0}$ can represent the wideband precoder associated with the root 402 for all frequency parts with sub-bands. A dimension of $W_{0,0}$ can be represented by $N_{tx} \times R$, where $N_{tx}$ is the CSI RS port number, and R is a feedback rank number, which can be a matrix or value. $W_{1,0}$ can represent an additional precoder for the first part of sub-bands, i.e., sub-bands 1,2, and $W_{1,1}$ which can be the additional precoder for the second part sub-bands, i.e. 3, 4 for level 1, for example. Likewise, a second level of precoders can be represented by $W_{2,m}$, m=0, 1, 2, 3, which correspond to an additional precoder for the (m+1)-th quarter of sub-bands, i.e. sub-bands m.

Let a precoder $W_{h,m}$ be parameterized by a parameter $a_{h,m}$ so $W_{h,m}=G(a_{h,m})$ where G(.) is a mapping function. A precoder can be generated for a first sub-band 308, for example, which can correspond to a precoder represented by $G(a_{0,0}+a_{1,0}+a_{2,0})$. A precoder can be generated for a second sub-band 310 that can be represented by $G(a_{0,0}+a_{1,0}+a_{2,1})$. A precoder can be generated for a third sub-band 312 that can be represented by $G(a_{0,0}+a_{1,1}+a_{2,2})$. A precoder can be generated for a fourth sub-band 314 that can be represented by $G(a_{0,0}+a_{1,1}+a_{2,3})$.

Additionally, or alternatively, codebook construction for $W_{h,m}$ can be Type II with progressively coarser resolutions or given rotations with coarser resolutions for rotation angles (e.g., $W_{0,0}$ with Type II, and $W_{h,m}$ for h>0) as configured by the UE 101 to be provided to the gNB 111. The given rotations can be with progressively coarser resolutions for rotation angles as configured for selectively reducing CSI feedback overhead. The UE 101 can generate a precoder codebook with precoders for the CSI feedback comprising progressively coarser resolutions for rotation angles at higher-indexed hierarchical precoding levels than for lower-indexed hierarchical precoding levels independent of or in combination with pruning mechanisms for selectively reducing CSI feedback overhead.

Additionally, or alternatively, at hierarchy precoding level h and frequency part m, h=0,1, ..., H, and m=0, ..., $2^h-1$, precoder $W_{h,m}$ is of dimension $N_{tx} \times R$, where $N_{tx}$ can represent a CSI RS port number, and R represent a feedback rank indicator (RI) value.

Referring to FIG. 4, illustrated is a further example of a precoding hierarchy for a hierarchical precoding scheme in accord with various aspects or embodiments. The precoding hierarchy 400 includes frequency parts 404 thru 414 and sub-bands 416 thru 432 with similar indexing as illustrated at FIG. 3, such that at a hierarchical precoding level h, of hierarchical precoding layers H can be represented by frequency part $P_{h-1,m}$, m=0, ..., $2^{h-1}-1$, from level h-1. The UE 101 can divide frequency part $P_{h-1,m}$ into two frequency parts $P_{h,2m}$ and $P_{h,2m+1}$, which, for example, can be approximately equally between them; alternatively, the dividing can be formulated such that there are two sub-trees (leaves) $P_{h,2m}$ and $P_{h,2m+1}$ from sub-tree $P_{h-1,m}$.

In an aspect, the UE 101 can prune one or more hierarchical precoding levels (e.g., Level(s) 1 to 3) of frequency parts 404 thru 414 or sub-bands 416 thru 432 based on an overhead reduction mechanism for the CSI feedback as part of the hierarchical precoding scheme. A bitmap for each hierarchy precoding level can then be configured by the UE 101 that indicates non-pruned sub-bands and pruned sub-bands associated with the CSI feedback. As illustrated in FIG. 4, pruned sub-bands 416 thru 430 for example are indicated by an X over them and are thus eliminated from being considered in the CSI feedback to the gNB 111 to reduce feedback overhead.

In particular, the UE 101 can determine whether a predetermined difference or difference in precoder configuration exists between sub-bands and then these precoders associated with the sub-bands can be eliminated from feedback. Accordingly, in the example precoding hierarchy 400 only the sub-band 432, along with the parent frequency parts 414 and 406 along with the 402 are configured in the CSI feedback. The UE 101, for example, can make such determinations of difference among precoders corresponding to any two sub-bands (e.g., 416 and 418) of a sub-tree or frequency part (e.g., 408) they are divided from. Likewise, similar determinations can be made through the precoding hierarchy 400 until a single sub-band (e.g., 432, or the like) is determined for the CSI feedback. The UE 101 selects a sub-band of a lowest level of a precoding hierarchy for a precoder of the CSI feedback, and then can generate a precoding for frequency bands at one or more hierarchical precoding levels of a frequency part that comprises the sub-band selected for the precoder of the CSI feedback.

Alternatively, or additionally, precoders can be configured or mapped to the CSI feedback for each hierarchical level of a precoding hierarchy, or at any one or more of the hierarchical levels of the precoding hierarchy. For example, a bitmap or mapping to the CSI feedback can be generated at a hierarchical precoding level that is higher than the highest-indexed precoding level, such as at only level 2, level 1, or level 0, or any combination of hierarchical levels. A bitmap or mapping to the CSI feedback can be generated or determined for only the highest-indexed hierarchical level (e.g., level 3), or any one or more hierarchical levels of the precoding hierarchy. Any combination of one or more hierarchical levels can be associated with generating or mapping one or more bitmaps for associated one or more precoders, for example.

With notations established, in similar fashion with respect to FIG. 3 above, a precoder can be generated according to the sub-band selected, in which in FIG. 3 a first, second, third, fourth sub-band, etc., can correspond to respective representations: $W_{2,0}$; $W_{2,1}$; $W_{2,2}$; and $W_{2,3}$. FIG. 4 illustrates further example where there are N=8 sub-bands for a CSI feedback report. Here, the UE 101 can report a bitmap [00 00 00 01] for level 3, in which the hierarchical levels can be H=$\log_2$ (8)=3 as representing the highest-indexed level; and for level 2 the UE reports [0 0 0 1], and for level 1 the UE report [0 1]. Then in response to receive such feedback, the gNB 111 can configure or deduce information from different bitmaps. From the level 1 bitmap, the gNB 111 can determine that $W_{1,0}$ is not included the feedback, but $W_{1,1}$ is, for example. From the level 2 bitmap, the gNB 111 can further determine that $W_{2,0}$, $W_{2,1}$, $W_{2,2}$ are not included in the feedback, but $W_{2,3}$ is, for example. From the level 3 bitmap, the gNB 111 can further determine that $W_{3,k}$, k=0,1,2,4,5,6 are not included in the feedback, but $W_{3,7}$ is.

Additionally, or alternatively, in response to receiving CSI feedback from the UE 101, the gNB 111 can configure the PMI precoder components from level 0 to level H without considering sub-tree pruning, as follows:

$W_{0,0}$, $W_{1,0}, W_{1,1}$, $W_{2,0}, W_{2,1}, W_{2,2}, W_{2,3}$, $W_{3,0}, W_{3,1}, W_{3,2}, W_{3,3}, W_{3,4}, W_{3,5}, W_{3,6}, W_{3,7}$.

The gNB 111 can arrange the PMI components from level 0 to level H when considering sub-tree pruning, in which the underlined components are not included for the CSI report as follows:

$W_{0,0}$, $\underline{W_{1,0}}, W_{1,1}$, $\underline{W_{2,0}}, \underline{W_{2,1}}, \underline{W_{2,2}}, W_{2,3}$, $\underline{W_{3,0}}, \underline{W_{3,1}}, \underline{W_{3,2}}, \underline{W_{3,3}}, \underline{W_{3,4}}, \underline{W_{3,5}}, \underline{W_{3,6}}, W_{3,7}$.

The omission of the underlined components can be completely determined by the gNB 111 based on the level 1 to level H bitmaps included in the CSI feedback, or provided by higher layer signaling (e.g., RRC signaling or the like). The gNB 111 can thus process the CSI feedback provided by the UE 101, for example, based on an omission rule according to one embodiment or aspect. In a typical CSI feedback, RI (Rank Indication), wideband CQI, sub-band CQIs which can be diffential CQIs with respect to the wideband CQI are also included. Considering in NR, up to 8 transmission layers are supported. If RI indicates 5 or more spatial layers, the spatial layers are mapped to two transport blocks, and CQI and sub-band CQIs are calculated respectively for each transport. It can be seen that depending on whether RI>4 or not, and the number of pruned sub-bands are selected (and correspondingly the number of non-pruned sub-bands), the CSI feeddback is not fixed. To aid decoding on the gNB side, CSI feedback can be divided into two parts: in part 1, RI, wideband CQI, sub-band CQIs for the first transport block, and the bitmaps indicating pruned/non-pruned sub-bands are included, in part 2, in a second transmission or feedback, sub-band CQIs for the second transport block, and the PMI feedback as given below in the readout sequence are included. If more than one CSI-RS resources are provided to the UE for hierarchical precoding feedback, then CRI (CSI-RS Resource Indicator) can be also included in a first part (or Part 1) of the CSI feedback, which can be in a different/separate transmisssion for feedback than a second part of the CSI. In particular, an omission rule can be configured according to when a feedback overhead for a given rank is more than what can be sent back to the gNB 111 with a prescribed resource by the gNB 111. A readout or provided report by the UE 101 for feedback can be in sequence order from the lowest-indexed level (i.e. level 0) to the highest-indexed level (i.e level H), or alternatively, from a highest-indexed level to a lowest-index level of precoders based on the hierarchical precoding scheme described according to aspects or embodiments herein. At the same level, the readout is from the lowest-index frequency part to the highest index frequency part. The UE 101, for example, can be configured to read out as many precoder components as not to exceed the payload given by the prescribed resource. Consequently, a limit of a resource or CSI can be provided to the UE 101, either by the gNB 111 or higher layer signalling, for example. In this manner, a two step CSI feedback can be configured by the UE 101 in response to the limit being exceeded. In a first step, level H bitmap can be included in a first part or step of the CSI feedback. The gNB 111 can determine a size of the feedback based on the bitmap, in which its feed size can be invariant, and the bitmap reveals the feedback size attached with precoders, which can be included in a second part or step with second CSI feedback, for example.

In an example, pruning or elimination can be performed or analyzed according to a top-up approach or a bottom-down approach. Here, one or more bitmaps corresponding to the hierarchical precoding levels, respectively, can be configured or evaluated based on a top-down approach by starting at a lowest-indexed hierarchical precoding level in a precoding hierarchy of the hierarchical precoding scheme. The lowest-indexed hierarchical precoding level comprises the frequency band as a root frequency part, for example. Alternatively, or additionally, the bitmap(s) can be configured by the UE 101 or evaluated by the gNB 111 corresponding to the hierarchical precoding levels, respectively, based on a bottom-up approach starting at a highest indexed hierarchical precoding level In another aspect, hierarchical encoding can be configured as a product of a number of precoders, in which a similar treatment can be applied to one or more parameters. For example, the UE 101 can configure a precoder to be parameterized by $\alpha$ and $\beta$ for example, $W(\alpha, \beta)$. Here, $\alpha$ and $\beta$ can be functions of frequency, and the wideband parameter function for $\alpha$ can be an average over all N sub-bands, and $\alpha_{h,m}$ can be the value to be applied over $P_{h,m}$. Here, the matter becomes utilizing different quantization levels for different sub-trees, for higher levels, where decreasingly fewer bits can be used.

Figure 5:
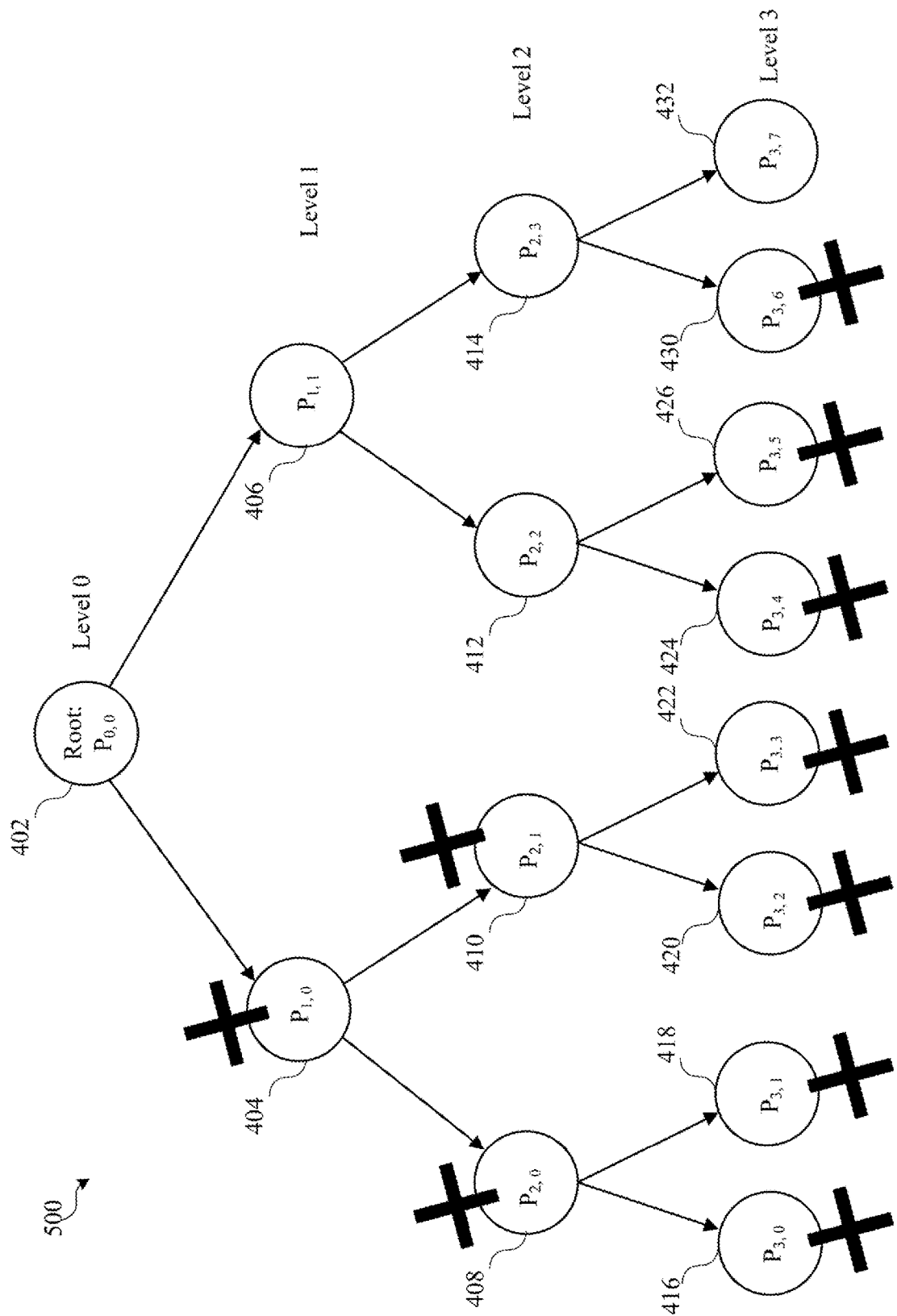
FIG. 5 is an illustration of another example precoding hierarchy for a hierarchical precoding scheme in accordance with various aspects.

Referring to FIG. 5, illustrated is another example precoding hierarchy 500 similar to the precoding hierarchy 400 of FIG. 4 for a hierarchical precoding scheme in accordance with various aspects. As described above, feedback information from different hierarchical levels can be used in a number of ways. For example, the feedback information from the root level 402 (level 0) to the highest-indexed level (level 3) can be utilized, which can come in the form of applying a product of precoders at different hierarchical levels or selection of precoders at different hierarchical levels corresponding to non-pruned leaves, or non-pruned sub-bands of the hierarchical tree structure as a precoding hierarchy 500. A readout or determined report at the gNB 111 for corresponding precoders to locations of CSI feedback can be from the lowest-indexed level (i.e. level 0) to the highest level (i.e level H). At the same level, the readout (rendering, processing, or other means of evaluation or providing) can be from the lowest-index frequency part to the highest index frequency part. For example, an evaluation or readout for the corresponding precoders of the CSI feedback can start from a highest indexed level. If a leaf (as a frequency part, or sub-band) is "0" then the leaf can be pruned; otherwise then the leaf is non-pruned, in which a bit can be "1" (or vice versa) of a corresponding bitmap. For a level of another index, if both child leaves of a leaf are "0", then the leaf is pruned, otherwise the leaf is non-pruned.

Alternatively, or additionally, a hierarchical precoding level of frequency parts (e.g., level 2) can have more than one non-pruned frequency part, in which although the child nodes (424 and 426) of FIG. 5 are pruned, the frequency part corresponding to part 412 can still be reported and determined in the CSI feedback. For example, level 2 can comprise bits [0 0 1 1].

In addition, or alternatively, For the highest indexed level, if a leaf (as a frequency part, or sub-band) is "0", then the leaf is pruned or marked for omission; otherwise then the leaf is non-pruned or not marked for omission. For a leaf at a level between the highest-indexed level and the top level (the root level), if the leaf is "0", then the leaf is pruned or marked for omission; if the leaf is "1", if at least one child leaf is "0", then the leaf is non-pruned or not marked for omission, otherwise (both child leaves are "1") then the leaf is pruned or marked for omission. For the top level, if at least one child leaf is "0", then the leaf is non-pruned or not marked for omission, otherwise (both child leaves are "1") then the leaf is pruned or marked for omission. Precoders for pruned leaves (or leaves marked for omission) are not included in the CSI feedback. Note this pruning process can be used for the case where a single bitmap of the highest indexed level is fed back by the UE and also for the case where bitmaps of multiple or all hierarchical levels are fed back by the UE. When bitmaps of multiple or all hierarchical levels, they are included in the first part of CSI report.

In addition, or alternatively, the gNB 111 can reconstruct applicable precoders from the CSI feedback in a sequence from bottom to top, or from highest-indexed level to the lowest-indexed level (or vice-versa), and at each level from left to right, or from the lowest-index frequency part to the highest index frequency part. The sub-band 432, for example, can have its own precoder, while sub-band 424 or 426 can have precoders that are derived from the parent 412, sub-band 430 can have a precoder that is derived from the parent 414. Sub-bands 416, 418, 420, 422 can have precoders that are derived from the great-grand-parent 402. Working in reverse from the highest-indexed level to the lowest indexed level, a precoder for a parent would apply the precoder of the child.

Figure 6:
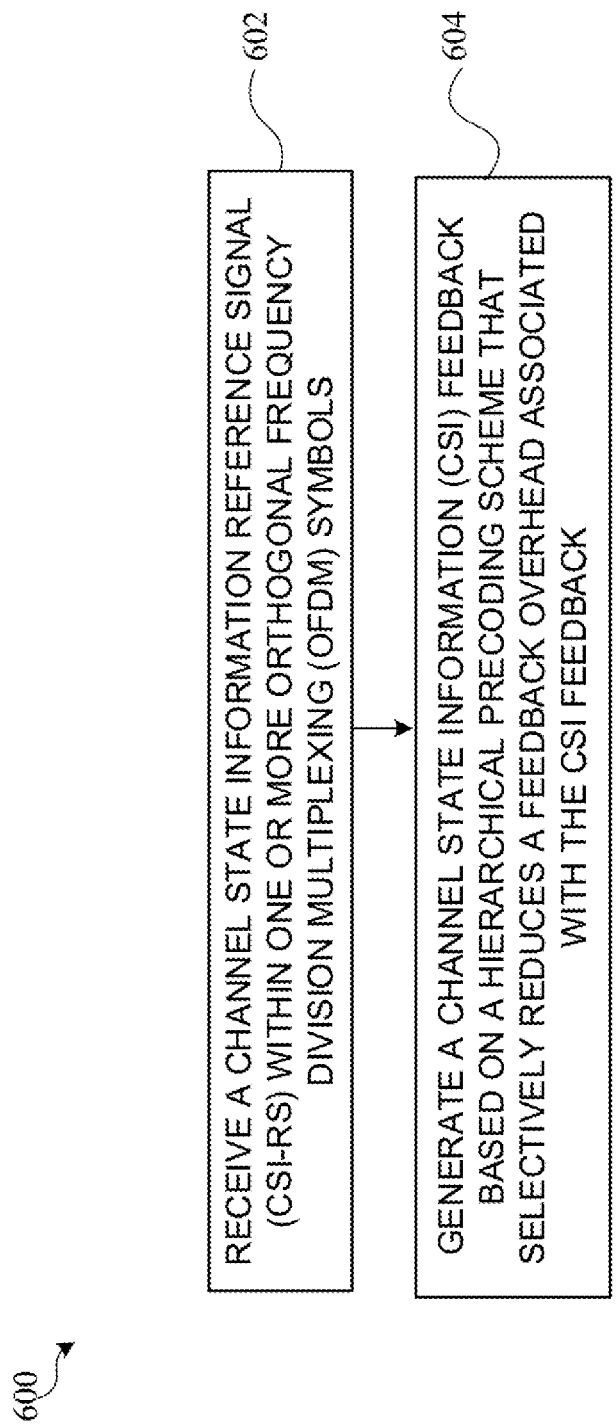
FIG. 6 is another block diagram illustrating an example process flow for hierarchical precoding according to various aspects.

Referring to FIG. 6, illustrated is an example process flow 600 for a network device or component (e.g., UE 101, base station 110, AP 106 or other network component) to perform a hierarchical precoding scheme according to various aspects/embodiments being described herein. The process flow 600 initiates at 602 with receiving a CSI-RS within one or more OFDM symbols. At 604, the process flow further comprises generating a channel state information (CSI) feedback based on a hierarchical precoding scheme that selectively reduces a feedback overhead associated with the CSI feedback according to any one or more aspects described throughout this disclosure. The UE can further transmit the CSI feedback to a base station.

In an aspect, the UE 101, for example, can sub-divide a frequency band of a hierarchical precoding level into frequency parts at one or more lower hierarchical levels for the hierarchical precoding scheme. The sub-dividing of the frequency parts at the one or more hierarchical levels into sub-bands can be performed to form sub-trees of a precoding hierarchy, wherein the frequency parts comprise equally divided frequency parts of the frequency band, and the sub-bands comprise a highest-indexed hierarchical precoding level for the hierarchical precoding scheme, for example.

In response to the CSI feedback exceeding a feedback payload limit, the CSI feedback can be generated in two parts by providing a bit map of sub-bands indicating which of the sub-bands or frequency parts are associated with the CSI feedback and further providing the CSI feedback associated with precoding matrix index (PMI) precoders based on the hierarchical precoding scheme.

Figure 7:
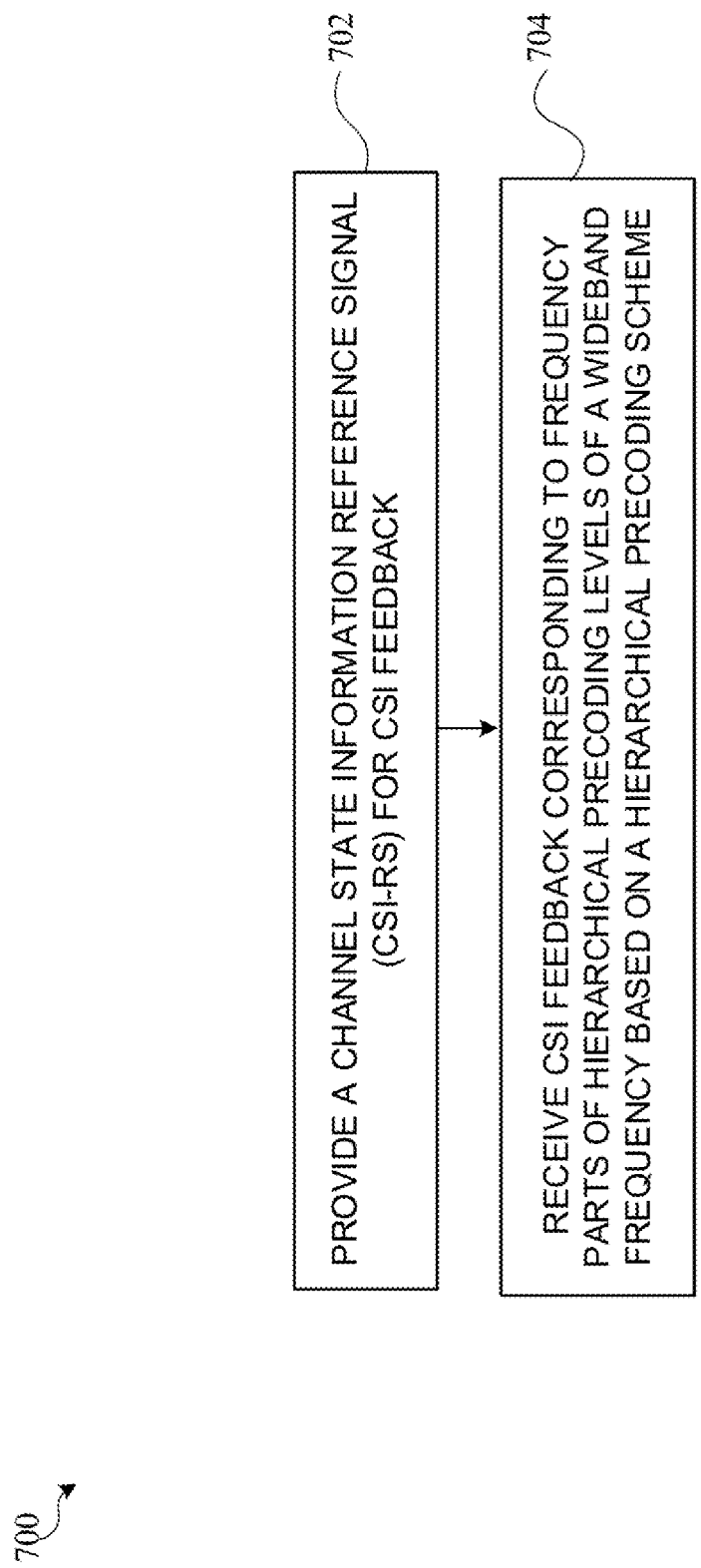
FIG. 7 is another block diagram illustrating an example process flow for hierarchical precoding according to various aspects.

Referring to FIG. 7, illustrated is an example process flow 700 for a network device or component (e.g., eNB/gNB 111, base station 110, AP 106 or other network component) to perform a hierarchical precoding scheme according to various aspects/embodiments being described herein. The process flow 700 initiates at 702 with providing a channel state information reference signal (CSI-RS) for CSI feedback. At 704, the process flow comprises receiving CSI feedback corresponding to frequency parts of hierarchical precoding levels of a wideband frequency based on a hierarchical precoding scheme.

In an aspect, the gNB 111 or other network component can determine which precoders correspond to one or more frequency parts, or one or more sub-bands, of the hierarchical precoding levels that are associated with the CSI feedback to pair the CSI feedback with a physical channel for a UE. The precoders can be configured based on a product of a first matrix and a second matrix for the hierarchical precoding levels of the hierarchical precoding scheme, wherein the first matrix is comprises a CSI-RS port number, and the second matrix is rank dependent based on a feedback rank indictor (RI). Alternatively, or additionally, the precoders can be configured according to an independent matrix of a CSI-RS port number with a rank value.

Bitmaps corresponding to the hierarchical precoding levels, respectively, can be further generated based on a top-down approach starting at a first hierarchical level comprising a root frequency part or a bottom-up approach starting at a highest indexed hierarchical level comprising frequency parts within sub-tree branch divisions of a sub-bands derived from the root frequency part. These can be used to then evaluate or re-structure CSI feedback.

In an aspect, a payload limit that associated with the CSI feedback can be provided by the gNB 111 or received by UE 101, for example. In response to the CSI feedback exceeding the payload limit, a bitmap that indicates one or more precoders associated with the CSI feedback and other precoders omitted from the CSI feedback can be received and processed, while a second CSI feedback is received according to a payload size indicated by the bitmap. The size of the feedback can be further ascertained based on the bitmap for allocating resources accordingly.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an user equipment (UE) device, comprising: a memory; a processor configured to: receive a channel state information reference signal (CSI-RS) within one or more orthogonal frequency division multiplexing (OFDM) symbols; generate a channel state information (CSI) feedback based on a hierarchical precoding scheme that selectively reduces a feedback overhead associated with the CSI feedback; and transmitting the CSI feedback to a base station.

A second example can include the first example, wherein the processor is further configured to: sub-divide a frequency band into different hierarchical precoding levels of a precoding hierarchy for the hierarchical precoding scheme.

A third example can include the first or second example, wherein the different hierarchical precoding levels of the precoding hierarchy comprise: at least one hierarchical precoding level that includes frequency parts of the frequency band, and at least one other hierarchical precoding level that is lower than the at least one hierarchical precoding level.

A fourth example can include any one or more of the first through third examples, wherein the at least one other hierarchical precoding level comprises sub-bands formed into sub-trees of the precoding hierarchy from the frequency parts of the at least one hierarchical precoding level.

A fifth example can include any one or more of the first through fourth examples, wherein the processor is further configured to: select (map, determine, or identify) a sub-band of a highest-indexed level of a precoding hierarchy for a precoder of the CSI feedback.

A sixth example can include any one or more of the first through fifth examples, wherein the processor is further configured to: generate the CSI feedback comprising a bit-map that indicates non-pruned sub-band and pruned sub-bands among sub-bands of a highest-indexed hierarchical precoding level of a precoding hierarchy for the hierarchical precoding scheme.

A seventh example can include any one or more of the first through sixth examples, wherein the processor is further configured to: according to the bit-map, generate the CSI feedback comprising feedback of a precoder corresponding to a frequency part with a non-pruned sub-band from the lowest-indexed hierarchical precoding level to the highest-indexed hierarchical precoding level and increasing with a frequency part index at a same hierarchical precoding level.

An eighth example can include any one or more of the first through seventh examples, wherein the processor is further configured to: provide feedback comprising one or more of a CSI-RS Resource Indicator (CRI), a rank indicator (RI), wideband channel quality indicator (CQI) for a first transport block, a sub-band CQI for the first transport block with an increasing order of a sub-band index, wherein the bit-map indicates the non-pruned sub-band and the pruned sub-bands among sub-bands of the highest-indexed hierarchical precoding level, and other precoder construction information in a first part of the CSI feedback; and provide feedback comprising a wideband CQI for a second transport block and sub-band CQIs for the second transport block if RI>4, and precoders generated according to the bit-map in a second part of CSI feedback.

A ninth example can include any one or more of the first through eighth examples, wherein the size of the bitmap is the number of sub-bands at the highest-indexed hierarchical precoding level including both pruned and non-pruned sub-bands.

A tenth example can include any one or more of the first through ninth examples, wherein the processor is further configured to: determine a precoder at one or more hierarchical precoding levels based on at least one of: $N_{tx} \times R$, or $N_{tx} \times R_1$, wherein $N_{tx}$ comprises a CSI-RS port number and R comprises a feedback rank indicator (RI), and $R_1$ is greater than R.

An eleventh example can include any one or more of the first through tenth examples, wherein the processor is further configured to: generate the hierarchical precoding scheme based on an overhead reduction mechanism that comprises differing the feedback overhead of the CSI feedback among hierarchical precoding levels of a precoding hierarchy.

A twelfth example can include any one or more of the first through eleventh examples, wherein the feedback overhead among the hierarchical precoding levels is less at a higher-indexed hierarchical precoding level than a lower-indexed hierarchical precoding level of a precoding hierarchy.

A thirteenth example can include any one or more of the first through twelfth examples, wherein the processor is further configured to: prune one or more hierarchical precoding levels of frequency parts or sub-bands based on an overhead reduction mechanism for the CSI feedback; and generate a bit-map that indicates non-pruned sub-bands and pruned sub-bands associated with the CSI feedback.

A fourteenth example can include any one or more of the first through thirteenth examples, wherein the processor is further configured to: determine different divisions of frequency parts of a frequency band based on a predetermined size, or adapting a size of the different divisions based on a parent frequency part of a lower-indexed hierarchical level so that approximately equal portions of the different divisions are apportioned to sub-band divisions of a higher-indexed hierarchical level for the hierarchical precoding scheme.

A fifteenth example can include any one or more of the first through fourteenth examples, wherein the processor is further configured to: generate a precoder codebook with precoders for the CSI feedback comprising progressively coarser resolutions for rotation angles at lower-indexed hierarchical precoding levels than higher-indexed hierarchical precoding levels that comprise frequency parts, or sub-bands of a frequency band for the hierarchical precoding scheme.

A sixteenth example can include any one or more of the first through fifteenth examples, wherein the processor is further configured to: generate the CSI feedback based on an omission rule, wherein the omission rule comprises including in the CSI feedback one or more precoders of the CSI feedback from a lowest-indexed hierarchical precoding level to a highest-indexed hierarchical precoding level in response to the feedback overhead of the CSI feedback not to exceed a resource limit that is derived from at least one of: a network configuration or a network signaling; and generate the CSI feedback comprising feedback of one or more precoders corresponding to a frequency part with a non-pruned sub-band from the lowest-indexed hierarchical precoding level to the highest-indexed hierarchical precoding level and increasing with a frequency part index at a same hierarchical precoding level until the resource limit is reached based on the omission rule for omitting one or more precoders at the highest-indexed hierarchical precoding level or a hierarchical precoding level(s) indexed higher than the lowest-indexed precoding level.

A seventeenth example can include any one or more of the first through sixteenth examples, wherein the processor is further configured to: provide feedback comprising one or more of a CSI-RS Resource Indicator (CRI), a rank indicator (RI), wideband channel quality indicator (CQI) for a first transport block, a sub-band CQI for the first transport block with an increasing order of a sub-band index, wherein a bit-map indicates the non-pruned sub-band and pruned sub-bands among sub-bands of the highest-indexed hierarchical precoding level, and other precoder construction information in a first part of the CSI feedback; and provide feedback comprising a wideband CQI for a second transport block and sub-band CQIs for the second transport block if RI>4, and one or more precoders generated from the bit-map in a second part of CSI feedback.

An eighteenth example can include any one or more of the first through seventeenth examples, wherein the processor is further configured to: average one or more parameters as a function of frequency over sub-bands of frequency parts associated with a frequency band; and apply the one or more parameters across one or more hierarchical precoding levels of the hierarchical precoding scheme.

A nineteenth example can be a tangible computer readable storage device storing executable instructions that, in response to execution, cause one or more processors of a user equipment (UE) to perform operations, the operations comprising: receiving a channel state information reference signal (CSI-RS) within one or more orthogonal frequency division multiplexing (OFDM) symbols; and generating a channel state information (CSI) feedback based on a hierarchical precoding scheme that selectively reduces a feedback overhead associated with the CSI feedback.

A twentieth example can include the nineteenth example, wherein the operations further comprise: sub-divide a frequency band of a hierarchical precoding level into frequency parts at one or more lower hierarchical levels.

A twenty-first example can include any one or more of the nineteenth through twentieth examples, wherein the operations further comprise: sub-dividing the frequency parts at the one or more hierarchical levels into sub-bands to form sub-trees of a precoding hierarchy, wherein the frequency parts comprise equally divided frequency parts of the frequency band, and the sub-bands comprise a highest-indexed hierarchical precoding level for the hierarchical precoding scheme.

A twenty-second example can include any one or more of the nineteenth through twenty-first examples, wherein the operations further comprise: in response to the CSI feedback exceeding a feedback payload limit: generating the CSI feedback in two parts by providing a bit map of sub-bands indicating which of the sub-bands are associated with the CSI feedback and further providing the CSI feedback comprising precoding matrix index (PMI) precoders based on the hierarchical precoding scheme.

A twenty-third example can be a baseband processor, comprising: a memory; a processor configured to: receive a channel state information reference signal (CSI-RS) within one or more orthogonal frequency division multiplexing (OFDM) symbols; determine frequency parts of a frequency band and sub-bands from the frequency parts to be configured at different hierarchical levels in a hierarchical precoding scheme that selectively reduces a feedback overhead associated with channel state information (CSI) feedback; and generate the CSI feedback based on a precoding hierarchy of the hierarchical precoding scheme.

A twenty-fourth example can include the twenty-third example, wherein the processor is further configured to: prune sub-trees of the precoding hierarchy formed from the sub-bands based on precoders difference between the frequency parts or the sub-bands.

A twenty-fifth example can be a next generation NodeB (gNB), comprising: a memory; one or more processors configured to: transmit a channel state information reference signal (CSI-RS) for CSI feedback; and receive channel state information (CSI) feedback corresponding to one or more frequency parts at hierarchical precoding levels of a frequency band based on a hierarchical precoding scheme in response to providing the CSI-RS.

A twenty-sixth example can include the twenty-fifth example, wherein the hierarchical precoding levels comprise a highest-indexed precoding level that includes sub-bands sub-divided from the one or more frequency parts for the hierarchical precoding scheme.

A twenty-seventh example can include any one of the twenty-fifth through twenty-sixth examples, wherein a lowest-indexed hierarchical precoding level comprises the frequency band as a root frequency part.

A twenty-eighth example can include any one of the twenty-fifth through twenty-seventh examples, wherein the CSI feedback comprises one or more bitmaps that indicate a non-pruned sub-band and one or more pruned sub-bands among sub-bands and frequency parts of one or more hierarchical precoding levels of the hierarchical precoding levels in a precoding hierarchy for the hierarchical precoding scheme.

A twenty-ninth example can include any one of the twenty-fifth through twenty-eighth examples, identify, based on the one or more bitmaps, the non-pruned sub-band and the one or more pruned sub-bands among the sub-bands and the frequency parts of the one or more hierarchical precoding levels of a precoding hierarchy for the hierarchical precoding scheme; and map precoders received from the CSI feedback to one or more of the non-pruned sub-bands at the one or more hierarchical precoding levels.

A thirtieth example can include any one of the twenty-fifth through twenty-ninth examples, wherein the one or more processors are further configured to: map precoders received in the CSI feedback to the hierarchical precoding levels of the frequency band.

A thirty-first example can include any one of the twenty-fifth through thirtieth examples, wherein the one or more processors are further configured to: determine precoder from the CSI feedback based on the hierarchical precoding schemed.

A thirty-second example can include any one of the twenty-fifth through thirty-first examples, wherein the one or more processors are further configured to: determine which precoder positions are eliminated from the CSI feedback and a precoder positions that are associated with the CSI feedback at the hierarchical precoding levels.

A thirty-third example can include any one of the twenty-fifth through thirty-second examples, wherein the one or more processors are further configured to: map precoders of the CSI feedback into a hierarchical tree structure of the hierarchical precoding levels; and determine which sub-trees of the hierarchical tree structure are pruned from the CSI feedback based on the hierarchical precoding scheme, wherein the sub-trees are derived from frequency parts of the frequency band at the hierarchical precoding levels.

A thirty-fourth example can include any one of the twenty-fifth through thirty-third examples, wherein the one or more processors are further configured to: determine a feedback size based on the one or more bitmaps for a second CSI feedback in response to the CSI feedback exceeding a payload limit.

A thirty-fifth example can include any one of the twenty-fifth through thirty-fourth examples, wherein one or more precoders associated with the CSI feedback are parameterized by one or more parameters that are a function of frequency and averaged across sub-bands of the one or more frequency parts for the hierarchical precoding scheme.

A thirty-sixth example can be a tangible computer readable storage device storing executable instructions that, in response to execution, cause one or more processors of a network device comprising an access point or a next generation NodeB (gNB) to perform operations, the operations comprising: providing a channel state information reference signal (CSI-RS) for CSI feedback; and receiving CSI feedback corresponding to frequency parts of hierarchical precoding levels of a wideband frequency based on a hierarchical precoding scheme.

A thirty-seventh example can include the thirty-sixth example, wherein the operations further comprise: determining which precoders correspond to one or more frequency parts or one or more sub-bands of the hierarchical precoding levels are associated with the CSI feedback to pair the CSI feedback with a physical channel for a user equipment (UE).

A thirty-eighth example can include any one of the thirty-sixth through thirty-seventh examples, wherein the precoders are configured based on a product of a first matrix and a second matrix for the hierarchical precoding levels of the hierarchical precoding scheme, wherein the first matrix is comprises a CSI-RS port number, and the second matrix is rank dependent based on a feedback rank indictor (RI).

A thirty-ninth example can include any one of the thirty-sixth through thirty-eighth examples, wherein the operations further comprise: determining one or more bitmaps corresponding to the hierarchical precoding levels, respectively, based on a bottom-up approach starting at a highest indexed hierarchical level comprising frequency parts within sub-tree branch divisions of a sub-bands derived from the root frequency part.

A fortieth example can include any one of the thirty-sixth through thirty-ninth examples, wherein the operations further comprise: providing a payload limit associated with the CSI feedback; and in response to the CSI feedback exceeding the payload limit: receiving a bitmap that indicates one or more precoders associated with the CSI feedback and other precoders omitted from the CSI feedback in response to the CSI feedback exceeding the payload limit; and receiving a second CSI feedback according to a payload size indicated by the bitmap.

A forty-first example can include any one of the thirty-sixth through fortieth examples, wherein a feedback overhead among the hierarchical precoding levels is less at a higher-indexed hierarchical precoding level than a higher hierarchical precoding level with less feedback priority of a precoding hierarchy.

A forty-second example can be a baseband processor, comprising: a memory; processing circuitry configured to: provide a channel state information reference signal (CSI-RS) for CSI feedback; and receive channel state information (CSI) feedback corresponding to one or more frequency parts a frequency band based on a hierarchical precoding scheme.

A forty-third example can include the forty-second example, wherein the processing circuitry is further configured to: determine which precoders are associated with the CSI feedback and which precoders are omitted from the CSI feedback based on one or more bitmaps corresponding to the hierarchical precoding levels, respectively.

A forty-fourth example can include any one of the forty-second through forty-third examples, wherein the processing circuitry is further configured to: in response to the CSI feedback exceeding a payload limit: receiving a bitmap that indicates one or more precoders associated with the CSI feedback and other precoders omitted from the CSI feedback in response to the CSI feedback exceeding the payload limit; and receiving a second CSI feedback according to a payload size indicated by the bitmap.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A base station, comprising:
   a memory;
   one or more processors configured to:
      transmit a channel state information reference signal (CSI-RS) for CSI feedback; and
      receive channel state information (CSI) feedback corresponding to one or more frequency parts at hierarchical precoding levels of a frequency band based on a hierarchical precoding scheme in response to providing the CSI-RS.

2. The base station of claim 1, wherein the hierarchical precoding levels comprise a highest-indexed precoding level that includes sub-bands sub-divided from the one or more frequency parts for the hierarchical precoding scheme.

3. The base station of claim 1, wherein a lowest-indexed hierarchical precoding level comprises the frequency band as a root frequency part.

4. The base station of claim 1, wherein the CSI feedback comprises one or more bitmaps that indicate a non-pruned sub-band and one or more pruned sub-bands among sub-bands and frequency parts of one or more hierarchical precoding levels of the hierarchical precoding levels in a precoding hierarchy for the hierarchical precoding scheme.

5. The base station of claim 4, wherein the one or more processors are further configured to:
   identify, based on the one or more bitmaps, the non-pruned sub-band and the one or more pruned sub-bands among the sub-bands and the frequency parts of the one or more hierarchical precoding levels of a precoding hierarchy for the hierarchical precoding scheme; and
   map precoders received from the CSI feedback to one or more non-pruned sub-bands at the one or more hierarchical precoding levels.

6. The base station of claim 1, wherein the one or more processors are further configured to:
   map precoders received in the CSI feedback to the hierarchical precoding levels of the frequency band.

7. The base station of claim 1, wherein the one or more processors are further configured to:
   determine precoder from the CSI feedback based on the hierarchical precoding schemed.

8. The base station of claim 1, wherein the one or more processors are further configured to:
   determine which precoder positions are eliminated from the CSI feedback and a precoder positions that are associated with the CSI feedback at the hierarchical precoding levels.

9. The base station of claim 1, wherein the one or more processors are further configured to:
   map precoders of the CSI feedback into a hierarchical tree structure of the hierarchical precoding levels; and
   determine which sub-trees of the hierarchical tree structure are pruned from the CSI feedback based on the hierarchical precoding scheme, wherein the sub-trees are derived from frequency parts of the frequency band at the hierarchical precoding levels.

10. The base station of claim 9, wherein the one or more processors are further configured to:
    determine a feedback size based on one or more bitmaps for a second CSI feedback in response to the CSI feedback exceeding a payload limit.

11. The base station of claim 1, wherein one or more precoders associated with the CSI feedback are parameterized by one or more parameters that are a function of frequency and averaged across sub-bands of the one or more frequency parts for the hierarchical precoding scheme.

12. A tangible computer readable storage device storing executable instructions that, in response to execution, cause one or more processors of a base station to perform operations, the operations comprising:
    providing a channel state information reference signal (CSI-RS) for CSI feedback; and
    receiving CSI feedback corresponding to frequency parts of hierarchical precoding levels of a wideband frequency based on a hierarchical precoding scheme.

13. The tangible computer readable storage device of claim 12, wherein the operations further comprise:
    determining which precoders correspond to one or more frequency parts or one or more sub-bands of the hierarchical precoding levels are associated with the CSI feedback to pair the CSI feedback with a physical channel for a user equipment (UE).

14. The tangible computer readable storage device of claim 13, wherein the precoders are configured based on a product of a first matrix and a second matrix for the hierarchical precoding levels of the hierarchical precoding scheme, wherein the first matrix is comprises a CSI-RS port number, and the second matrix is rank dependent based on a feedback rank indictor (RI).

15. The tangible computer readable storage device of claim 12, wherein the operations further comprise:
    determining one or more bitmaps corresponding to the hierarchical precoding levels, respectively, based on a bottom-up approach starting at a highest indexed hierarchical level comprising frequency parts within sub-tree branch divisions of a sub-bands derived from a root frequency part.

16. The tangible computer readable storage device of claim 12, wherein the operations further comprise:
    providing a payload limit associated with the CSI feedback; and
    in response to the CSI feedback exceeding the payload limit:
        receiving bitmaps that indicate one or more precoders associated with the CSI feedback and other precoders omitted from the CSI feedback in response to the CSI feedback exceeding the payload limit; and
        receiving a second CSI feedback according to a payload size indicated by the bitmaps.

17. The tangible computer readable storage device of claim 12, wherein a feedback overhead among the hierarchical precoding levels is less at a higher-indexed hierarchical precoding level than a higher hierarchical precoding level with less feedback priority of a precoding hierarchy.

18. A baseband processor, comprising memory, configured to:
    provide a channel state information reference signal (CSI-RS) for CSI feedback; and
    receive channel state information (CSI) feedback corresponding to one or more frequency parts of a frequency band based on a hierarchical precoding scheme.

19. The baseband processor of claim 18, wherein the processing circuitry is further configured to:
    determine which precoders are associated with the CSI feedback and which precoders are omitted from the CSI feedback based on one or more bitmaps corresponding to hierarchical precoding levels, respectively.

20. The baseband processor of claim 18, wherein the processing circuitry is further configured to:
    in response to the CSI feedback exceeding a payload limit:
        receiving bitmaps that indicate one or more precoders associated with the CSI feedback and other precoders omitted from the CSI feedback in response to the CSI feedback exceeding the payload limit; and
        receiving a second CSI feedback according to a payload size indicated by the bitmaps.

* * * * *